United States Patent
Smook et al.

(10) Patent No.: US 10,060,416 B2
(45) Date of Patent: Aug. 28, 2018

(54) NACELLE MAIN FRAME STRUCTURE AND DRIVE TRAIN ASSEMBLY FOR A WIND TURBINE

(75) Inventors: Warren Smook, Huldenberg (BE); Wouter Remmerie, Berchem (BE)

(73) Assignee: ZF WIND POWER ANTWERPEN N.V., Lommel (BE)

( * ) Notice: Subject to any disclaimer, the term of this patent is extended or adjusted under 35 U.S.C. 154(b) by 745 days.

(21) Appl. No.: 14/127,181

(22) PCT Filed: Jul. 15, 2011

(86) PCT No.: PCT/EP2011/062154
§ 371 (c)(1),
(2), (4) Date: Apr. 3, 2014

(87) PCT Pub. No.: WO2013/010568
PCT Pub. Date: Jan. 24, 2013

(65) Prior Publication Data
US 2014/0212290 A1 Jul. 31, 2014

(51) Int. Cl.
*F03D 13/20* (2016.01)
*F03D 80/80* (2016.01)
(Continued)

(52) U.S. Cl.
CPC ............ *F03D 80/88* (2016.05); *F03D 13/20* (2016.05); *F03D 15/00* (2016.05); *F03D 80/70* (2016.05);
(Continued)

(58) Field of Classification Search
CPC ........... F05B 2250/313; F05B 2240/14; Y02E 10/72–10/728; F03D 11/0075;
(Continued)

(56) References Cited

U.S. PATENT DOCUMENTS

| 372,563 | A | * | 11/1887 | Poe | ........................ | F03D 1/0608 |
| | | | | | | 416/13 |
| 1,532,402 | A | * | 4/1925 | Hall | ........................ | F04D 25/02 |
| | | | | | | 416/170 R |

(Continued)

FOREIGN PATENT DOCUMENTS

| CN | 201 358 892 Y | 12/2009 |
| DE | 10 2007 009 575 A1 | 8/2008 |

(Continued)

OTHER PUBLICATIONS

Machine translation for DE EP1045139 A2, Oct. 18, 2000, [online]: Espacenet [retrieved on Jan. 27, 2017] Retrieved from www.espacenet.com.*

(Continued)

*Primary Examiner* — Craig J Price
(74) *Attorney, Agent, or Firm* — Davis & Bujold PLLC; Michael J. Bujold (57) ABSTRACT

A nacelle main frame structure and drive train assembly (10) for mounted on a tower (2) of a wind turbine (1). The nacelle main frame structure and drive train assembly (10) comprise a nacelle main frame structure (3) and at least part of a drive train (4). The at least part of the drive train (4) comprises a first connection interface (11) with the nacelle main frame structure (3) at a rotor side (R) of the nacelle main frame structure and drive train assembly (10) and a second connection interface (13) with the nacelle main frame structure (3). The second connection interface (13) is axially displaced with respect to the first connection interface (11) with respect to a direction away from the rotor side (R).

18 Claims, 5 Drawing Sheets

(51) Int. Cl.
*F03D 80/70* (2016.01)
*F03D 15/00* (2016.01)

(52) U.S. Cl.
CPC ..... *F05B 2240/14* (2013.01); *F05B 2250/313* (2013.01); *Y02E 10/721* (2013.01); *Y02E 10/726* (2013.01); *Y02E 10/728* (2013.01)

(58) Field of Classification Search
CPC .......... F03D 80/70; F03D 15/00; F03D 13/20; F03D 80/88
USPC ........................................ 416/170 R; 290/55
See application file for complete search history.

(56) References Cited

U.S. PATENT DOCUMENTS

| | | | | |
|---|---|---|---|---|
| 1,755,422 A * | 4/1930 | Bucklen | F03D 15/00 | 290/55 |
| 2,106,557 A * | 1/1938 | Putnam | F03D 7/0224 | 290/44 |
| 2,153,523 A * | 4/1939 | Edmonds | F03D 1/025 | 290/44 |
| 2,177,801 A * | 10/1939 | Erren | H02K 7/1838 | 290/55 |
| 2,417,022 A * | 3/1947 | Stagg | F03D 7/0212 | 16/313 |
| 2,655,604 A * | 10/1953 | Hutter | F03D 7/0224 | 290/55 |
| 2,832,895 A * | 4/1958 | Hutter | F03D 7/0224 | 290/44 |
| 3,575,527 A * | 4/1971 | Watanabe | F04D 25/08 | 416/169 A |
| 4,039,848 A * | 8/1977 | Winderl | F03D 1/025 | 290/55 |
| 4,178,124 A * | 12/1979 | Puskas | F03D 1/04 | 415/127 |
| 4,557,666 A * | 12/1985 | Baskin | F03D 1/0658 | 416/11 |
| 4,757,211 A | 7/1988 | Kristensen | | |
| 5,663,600 A * | 9/1997 | Baek | F03D 80/70 | 290/44 |
| 6,232,673 B1 | 5/2001 | Schoo et al. | | |
| 6,459,165 B1 * | 10/2002 | Schoo | F16H 1/46 | 290/1 C |
| 6,750,559 B2 * | 6/2004 | Becker | F03D 13/20 | 290/54 |
| 6,759,758 B2 * | 7/2004 | Torres Martinez | F03D 1/0691 | 290/43 |
| 6,833,632 B2 * | 12/2004 | Becker | F16D 1/033 | 290/44 |
| 6,872,049 B2 * | 3/2005 | Christensen | F03D 1/00 | 415/124.1 |
| 6,911,741 B2 * | 6/2005 | Pettersen | H02K 7/1838 | 290/44 |
| 6,984,899 B1 * | 1/2006 | Rice | F03D 3/049 | 290/44 |
| 7,011,598 B2 * | 3/2006 | Flamang | F03D 1/00 | 416/170 R |
| 7,090,465 B2 * | 8/2006 | Flamang | F03D 15/00 | 416/170 R |
| 7,410,442 B2 * | 8/2008 | Fox | F16C 19/364 | 416/170 R |
| 7,547,985 B2 * | 6/2009 | Takaichi | F03D 80/70 | 290/44 |
| 7,600,964 B2 * | 10/2009 | Rogall | F03D 7/0204 | 415/118 |
| 7,815,536 B2 * | 10/2010 | Jansen | F16H 1/28 | 290/55 |
| 7,918,648 B1 * | 4/2011 | Simnacher | F03D 3/067 | 416/111 |
| 8,075,190 B1 * | 12/2011 | Wadehn | F16C 32/0685 | 384/100 |
| 8,075,442 B2 * | 12/2011 | Ciszak | F03D 15/00 | 475/331 |
| 8,113,480 B2 * | 2/2012 | Davis | F03D 1/00 | 248/637 |
| 8,154,146 B2 * | 4/2012 | Fischer | H02K 5/1735 | 290/44 |
| 8,172,535 B2 * | 5/2012 | Nitzpon | F03D 80/70 | 416/170 R |
| 8,197,215 B2 * | 6/2012 | Andersen | F03D 80/50 | 415/229 |
| 8,203,230 B2 * | 6/2012 | Hennig | F03D 80/70 | 290/44 |
| 8,710,693 B2 * | 4/2014 | Amano | F03D 9/28 | 290/55 |
| 8,734,288 B2 * | 5/2014 | Poon | F16H 1/28 | 475/331 |
| 8,912,680 B2 * | 12/2014 | Gelmini | F03D 11/00 | 290/44 |
| 9,689,174 B2 * | 6/2017 | Gotfredsen | E04H 12/00 | |
| 2002/0187875 A1 * | 12/2002 | Chang | F16H 1/28 | 475/331 |
| 2007/0265133 A1 * | 11/2007 | Smook | F03D 15/00 | 475/317 |
| 2008/0272602 A1 * | 11/2008 | Kim | H02K 7/083 | 290/55 |
| 2009/0261594 A1 * | 10/2009 | Christensen | F03D 15/00 | 290/55 |
| 2010/0001525 A1 * | 1/2010 | Yang | F03D 3/005 | 290/44 |
| 2010/0032961 A1 * | 2/2010 | Numajiri | F03D 1/0658 | 290/55 |
| 2010/0062888 A1 * | 3/2010 | Ciszak | F03D 15/00 | 475/31 |
| 2010/0194114 A1 * | 8/2010 | Pechlivanoglou | F03D 7/0248 | 290/55 |
| 2010/0253087 A1 * | 10/2010 | Lauke | F03D 1/065 | 290/55 |
| 2011/0109100 A1 * | 5/2011 | Versteegh | F03D 11/00 | 290/1 B |
| 2011/0142598 A1 * | 6/2011 | Andersen | F03D 15/00 | 415/122.1 |
| 2011/0211962 A1 * | 9/2011 | Madge | F03D 15/00 | 416/170 R |
| 2011/0254279 A1 * | 10/2011 | Ventzke | F03D 9/25 | 290/55 |
| 2012/0039714 A1 * | 2/2012 | Lee | F03D 3/02 | 416/147 |
| 2012/0043762 A1 * | 2/2012 | Lee | F03D 3/005 | 290/55 |
| 2012/0051915 A1 * | 3/2012 | suzuki | F16H 57/082 | 416/170 R |
| 2012/0074712 A1 * | 3/2012 | Bursal | F03D 1/025 | 290/55 |
| 2012/0134811 A1 * | 5/2012 | Bagepalli | F03D 17/00 | 416/1 |
| 2012/0141279 A1 * | 6/2012 | Yasui | F03D 3/02 | 416/170 R |
| 2015/0292484 A1 * | 10/2015 | Haj-Maharsi | F03D 9/10 | 290/44 |

FOREIGN PATENT DOCUMENTS

| | | |
|---|---|---|
| EP | 1 045 139 A2 | 10/2000 |
| EP | 2 372 150 A1 | 10/2011 |
| JP | 2000337245 A | 12/2000 |
| JP | 2009138578 A | 6/2009 |
| WO | 2009/080712 A2 | 7/2009 |

OTHER PUBLICATIONS

International Search Report Corresponding to PCT/EP2011/062154 dated Mar. 20, 2012.
Written Opinion Corresponding to PCT/EP2011/062154 dated Mar. 20, 2012.

(56) References Cited

OTHER PUBLICATIONS

Japanese Office Action issued in corresponding Japanese Application No. 2014-519432 dated Feb. 3, 2015.

* cited by examiner

NACELLE MAIN FRAME STRUCTURE AND DRIVE TRAIN ASSEMBLY FOR A WIND TURBINE

This application is a National Stage completion of PCT/EP2011/062154 filed Jul. 15, 2011.

FIELD OF THE INVENTION

The present invention relates to a nacelle main frame structure and drive train assembly for being mounted on a tower of a wind turbine.

BACKGROUND OF THE INVENTION

The wind turbine market is changing fast nowadays. There is a continuing demand for larger wind turbines being able to generate a higher number of megawatts of electricity, also referred to as multi-megawatt wind turbines. At the same time the requirements for reduction of size and weight of the turbines and their components become more and more important.

In wind turbines, typically a wind turbine rotor drives a low speed shaft of a gear transmission unit or gearbox, which transforms torque and speed of the rotor to the required torque and speed of an electrical generator. The increasing demand for multi-megawatt wind turbines puts a challenging pressure on new designs of components for such wind turbines. This is because weight and cost of the wind turbine are to be kept as low as possible or at least within acceptable ranges, while at the same time it has to be made sure that the components can withstand high rotor loads being generated during operation of the wind turbine.

In existing turbine designs, two main categories can be distinguished. A first category comprises turbines with nacelle main frame structures that are strong enough on their own to handle all the loads that come from the rotor. An example of a turbine design belonging to this first category is turbine in which the nacelle main frame structure comprises a conventional bedplate design with two main bearings holding the main shaft. This, however, results in a heavy nacelle main frame, on which then a heavy drive train comprising, for example, a gearbox and/or a generator, is mounted. The reason why the drive train is made relatively heavy is that it has to be able to take full torque load. This results in a very heavy top mass of the wind turbine.

Design concepts in this first category do have a benefit of easy exchangeability of components of the drive train, but a major disadvantage of these design concepts is that the drive train itself is very heavy and does only partly participates in transferring rotor loads to the tower of the wind turbine. As a consequence a more robust nacelle main frame structure is required, which consequently results in a higher total weight of the nacelle main frame structure.

A second category comprises turbines with integrated nacelle main frame structure designs, in which the nacelle main frame structure and drive train form one unit. The benefit of such designs is that structural components are used in a more optimal way for transferring rotor loads to the tower. This is a more optimal use of the load carrying components and therefore the weight of the nacelle main frame structure can be reduced with respect to designs in the first category. However, these integrated designs make it more difficult for components to be serviced or replaced, which results in lower exchangeability possibilities and higher costs for service and maintenance activities.

It is clear from the above that for current existing turbine designs a compromise has to be found between optimal exchangeability possibilities of wind turbine components and optimal weight of the nacelle main frame structure.

SUMMARY OF THE INVENTION

The present invention provides a nacelle main frame structure and drive train assembly for being mounted on a tower of a wind turbine. The nacelle main frame structure and drive train assembly comprises a nacelle main frame structure and at least part of a drive train. The at least part of the drive train comprises a first connection interface with the nacelle main frame structure at a rotor side of the nacelle main frame structure and drive train assembly, and a second connection interface with the nacelle main frame structure, the second connection interface being axially displaced with respect to the first connection interface as considered in a direction away from the rotor side.

The first connection interface is different from the second connection interface. In other words, the first and second connection interfaces are formed independently from each other. Hence, the first and second connection interfaces do not form one and a same connection interface, but are really two separate connection interfaces. This means that the first connection interface and the second connection interface do not overlap or do not directly contact each other.

According to embodiments of the invention, the first connection interface may be oriented in a direction substantially perpendicular to an axis of the drive train or, in other words, in a direction substantially parallel to an axis of the tower. The second connection interface may be oriented in a direction substantially parallel to an axis of the drive train, or in other words, in a direction substantially perpendicular to an axis of the tower. Hence, according to these embodiments, the first and second connection interface may be oriented in a direction substantially perpendicular to each other.

An advantage of such orientation of the first and second connection interface according to embodiments of the invention is that no additional structure is to be provided to bring the rotor loads from a horizontal axis of the rotor to a vertical axis of the tower.

Hence, as a consequence of the design of a nacelle main frame structure and drive train assembly according to embodiments of the invention, during operation of the wind turbine a majority of all rotor loads may be transferred from the rotor via the drive train to the tower of the wind turbine. An advantage hereof is that the nacelle main frame structure requires considerably less material compared to existing nacelle main frame structures because most of the rotor loads are transferred via the drive train and not via the nacelle main frame structure itself. As a consequence, the nacelle main frame structure can be made considerably lighter than existing nacelle main frame structures.

According to embodiments of the invention, the drive train may comprise a gearbox and a generator. According to other embodiments, the drive train may comprise only a generator.

The nacelle main frame structure and drive train assembly may furthermore comprise at least one bearing, also referred to as main bearing, for supporting a rotor of the wind turbine. The nacelle main frame structure may comprise a first part for being connected to the rotor and a second part for being connected to the tower of the wind turbine. According to embodiments of the invention, the at least one bearing may be located on the first part of the nacelle main frame structure. According to such embodiments, the drive train may be axially displaced away from the rotor side of the nacelle main frame structure and drive train assembly with respect to the at least one bearing as considered in a direction parallel to the axis of the drive train. According to other embodiments, the at least one bearing may also be located on the drive train.

According to embodiments of the invention, the at least one bearing may be adapted for being connected to the rotor of the wind turbine via its outer ring. In such cases, the at least one bearing may be connected to the nacelle main frame structure by its inner ring.

According to other embodiments of the invention, the at least one bearing may be adapted for being connected to the rotor of the wind turbine via its inner ring. According to such embodiments, the at least one bearing may be connected to the nacelle main frame structure by its outer ring.

According to further embodiments, the drive train may furthermore comprise a third connection interface with the rotor of the wind turbine.

BRIEF DESCRIPTION OF THE DRAWINGS

It has to be noted that same reference signs in the different figures refer to same, similar or analogous elements.

DETAILED DESCRIPTION OF THE PREFERRED EMBODIMENTS

In the description different embodiments will be used to describe the invention. Therefore reference will be made to different drawings. It has to be understood that these drawings are intended to be non-limiting, the invention is only limited by the claims. The drawings are thus for illustrative purposes, the size of some of the elements in the drawings may be exaggerated for clarity purposes.

The term "comprising" is not to be interpreted as limiting the invention in any way. The term "comprising", used in the claims, is not intended to be restricted to what means is described thereafter; it does not exclude other elements, parts or steps.

The term "connected" as used in the claims and in the description has not to be interpreted as being restricted to direct connections, unless otherwise specified. Thus, part A being connected to part B is not limited to part A being in direct contact to part B, but also includes indirect contact between part A and part B, in other words also includes the case where intermediate parts are present in between part A and part B. Not all embodiments of the invention comprise all features of the invention. In the following description and claims, any of the claimed embodiments can be used in any combination.

The present invention will be described by means of different embodiments. It has to be understood that these embodiments are only for the ease of understanding the invention and are not intended to limit the invention in any way.

The present invention provides a nacelle main frame structure and drive train assembly for being mounted on a tower of a wind turbine. The nacelle main frame structure and drive train assembly comprises a nacelle main frame structure and at least part of a drive train. According to the invention, the at least part of the drive train comprises a first connection interface with the nacelle main frame structure at a rotor side of the nacelle main frame structure and drive train assembly and a second connection interface with the nacelle main frame structure which is axially displaced with respect to the first connection interface as considered in a direction away from the rotor side.

Figure 1:
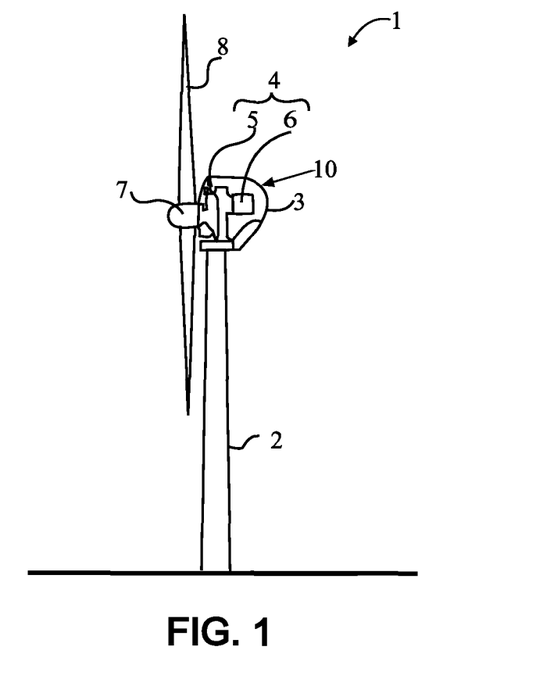
FIG. 1 is an elevation view of a wind turbine.

FIG. 1 illustrates a wind turbine 1. The wind turbine 1 comprises a tower 2 onto which a nacelle main frame structure and drive train assembly 10 is provided. The nacelle main frame structure and drive train assembly 10 comprises a nacelle main frame structure 3 and a drive train 4. The drive train 4 may, according to embodiments of the invention and as shown in FIG. 1, comprise a gearbox 5 and a generator 6. However, according to other embodiments of the invention, the drive train 4 may comprise only a generator 6. The wind turbine 1 furthermore comprises a rotor 7 and rotor blades 8.

Figure 2:
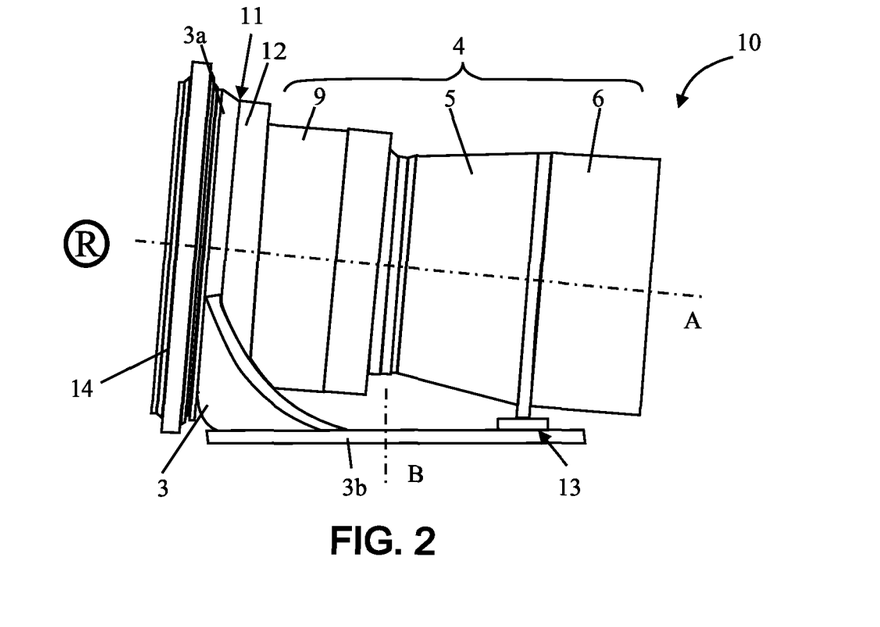
FIG. 2 to FIG. 4 show 3-dimensional views of a nacelle main frame structure and drive train assembly according to embodiments of the invention.
Figure 3:
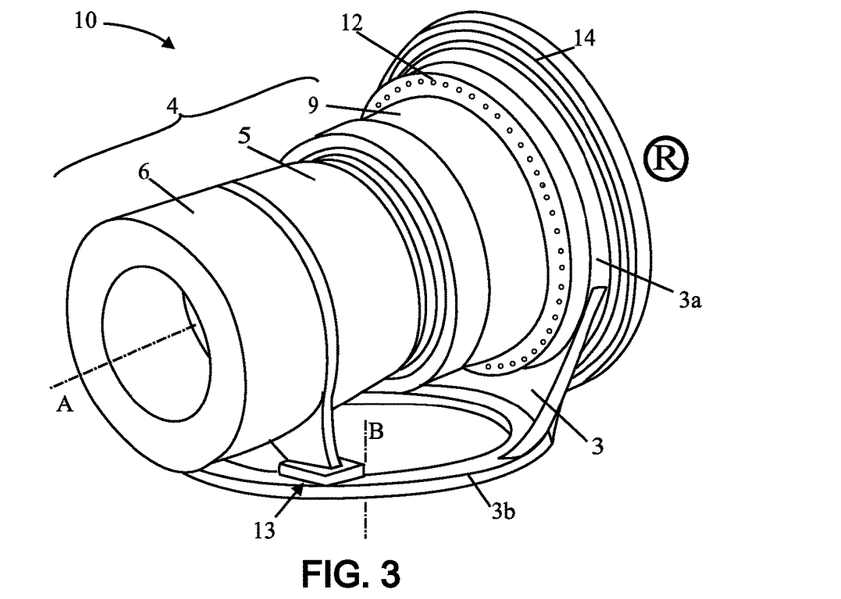
Figure 4:
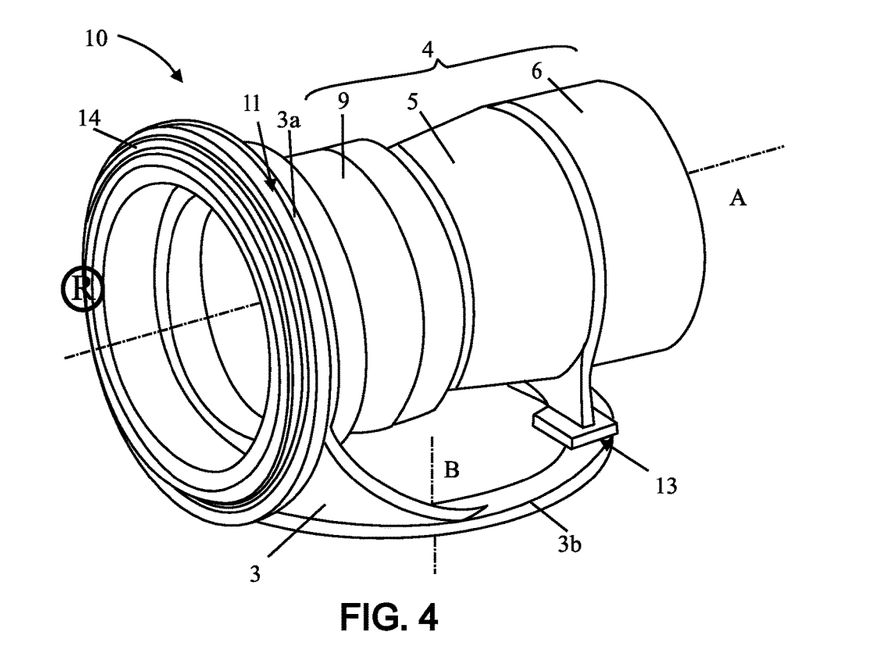
Figure 5:
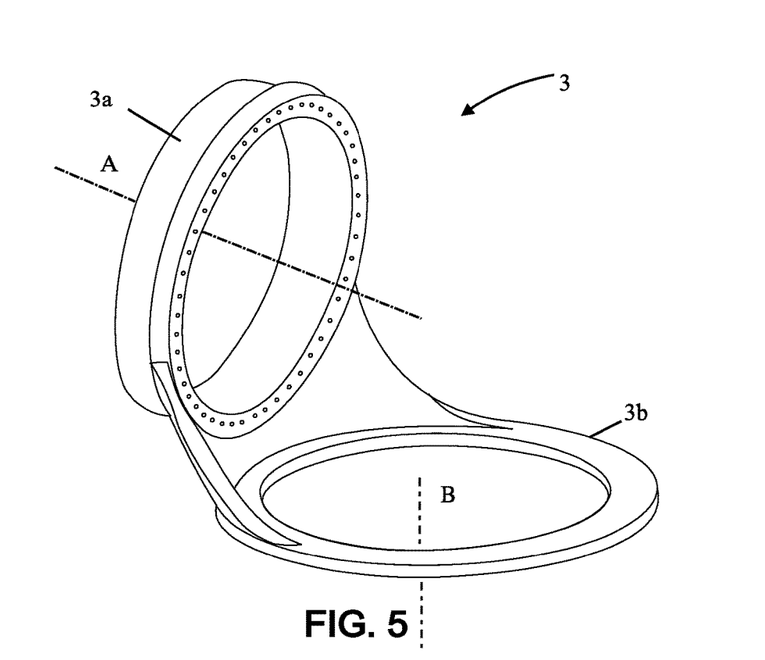
FIG. 5 shows a 3-dimensional view of a nacelle main frame structure according to embodiments of the invention.

FIG. 2 to FIG. 4 show 3-dimensional views of a nacelle main frame structure and drive train assembly 10 according to embodiments of the invention. In the example given, the drive train 4 may, next to the gearbox 5 and generator 6, also comprise a ring gear 9. The nacelle main frame structure 3, which is illustrated in FIG. 5, may comprise a first part 3a for being connected to the rotor 7 of the wind turbine 1 and a second part 3b for being connected to the tower 2 of the wind turbine 1. Gearboxes 5 and/or generators 6 which can be used for the drive train 4 according to embodiments of the invention may be any suitable gearbox and/or generator as known by a person skilled in the art.

The drive train 4 has a first connection interface 11 with the nacelle main frame structure 3 at the first part 3a of the nacelle main frame structure 3. Hence, the first interconnection interface 11 is located at a rotor side R of the nacelle main frame structure and drive train assembly 10. The rotor side R of the nacelle main frame structure and drive train assembly 10 is that side of the nacelle main frame structure and drive train assembly 10 which is for connecting to the rotor 7 of the wind turbine 1. The drive train 4 may be connected to the first part 3a of the nacelle main frame structure 3 by means of a flange 12. The first connection interface 11 is oriented in a direction substantially perpendicular to the axis A of the drive train 4. Or in other words, the first connection interface 11 is oriented in a direction substantially parallel to an axis B of the tower 2 of the wind turbine 1.

A second connection interface 13 between the nacelle main frame structure 3 and the drive train 4 is with the second part 3b of the nacelle main frame structure 3. The second connection interface 13 is axially displaced with respect to the first connection interface 11 as considered in a direction away from the rotor side R. According to embodiments of the invention, and as illustrated in FIG. 2 to FIG. 4, the second connection interface 13 comprises a ring and may be oriented in a direction substantially parallel to the axis A of the drive train 4 or, in other words, is oriented in a direction substantially perpendicular to the axis B of the tower 2 of the wind turbine 1. Hence, from the above it is clear that the first connection interface 11 and the second connection interface 13 may be oriented substantially perpendicular to each other.

The first connection interface is different from the second connection interface. In other words, the first and second connection interfaces are formed independently from each other. Hence, the first and second connection interfaces do not form one and a same connection interface, but are really two separate connection interfaces. This means that the first connection interface and the second connection interface do not overlap or do not directly contact each other.

The nacelle main frame structure and drive train assembly 10 according to embodiments of the invention may furthermore comprise at least one main bearing 14 for supporting the rotor 7 of the wind turbine 1. As can be seen from FIG. 2 to FIG. 4, according to embodiments of the invention, the main bearing 14 may be located on the first part 3a of the nacelle main frame structure 3.

As known by a person skilled in the art, conventional bearings have an inner ring and an outer ring with in between bearing rollers. In the examples given in FIG. 2 to FIG. 4 as well as in the cross-section of FIG. 6 the main bearing 14 may be adapted for being connected to the rotor 7 of the wind turbine 1 via its outer ring. In other words, when a nacelle main frame structure and drive train assembly 10 according to the embodiments illustrated in FIG. 2 to FIG. 4 and FIG. 6 is mounted in a wind turbine 1, the main bearing 14 may be connected to the rotor 7 of the wind turbine 1 via its outer ring. Consequently, the main bearing 14 may be connected to the first part 3a of the nacelle main frame structure 3 by its inner ring. In such cases, the inner diameter $D_1$ of the first part 3a of the nacelle main frame structure 3 is smaller than the inner diameter $D_2$ of the main bearing 14 (see FIG. 6).

Figure 7:
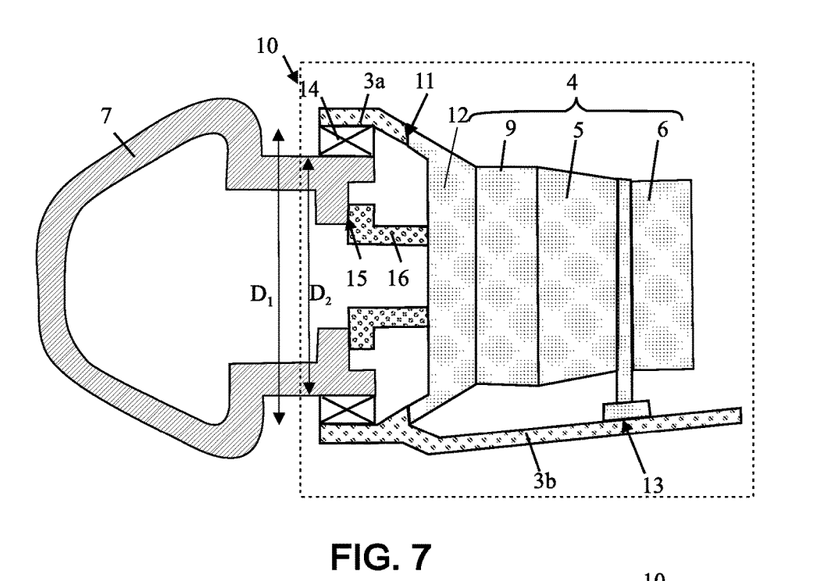

According to other embodiments of the invention, the main bearing 14 may be adapted for being connected to the rotor 7 of the wind turbine 1 via its inner ring. In other words, when a nacelle main frame structure and drive train assembly 10 according to such embodiments is mounted in a wind turbine 1, the main bearing 14 may be connected to the rotor 7 via its inner ring. This is illustrated in FIG. 7. Consequently, according to these embodiments, the main bearing 14 may be connected to the first part 3a of the nacelle main frame structure 3 via its outer ring. As can be seen from FIG. 7, the diameter $D_1$ of the first part 3a of the nacelle main frame structure 3 is larger than the diameter $D_2$ of the main bearing 14.

Because according to the embodiments illustrated in FIG. 2 to FIG. 4 and FIG. 6 and FIG. 7 the main bearing 14 is located on the first part 3a of the nacelle main frame structure 3, the drive train 4 is axially displaced away from the rotor side R with respect to the main bearing 14 in a direction substantially parallel to the axis of the drive train 4.

Figure 8:
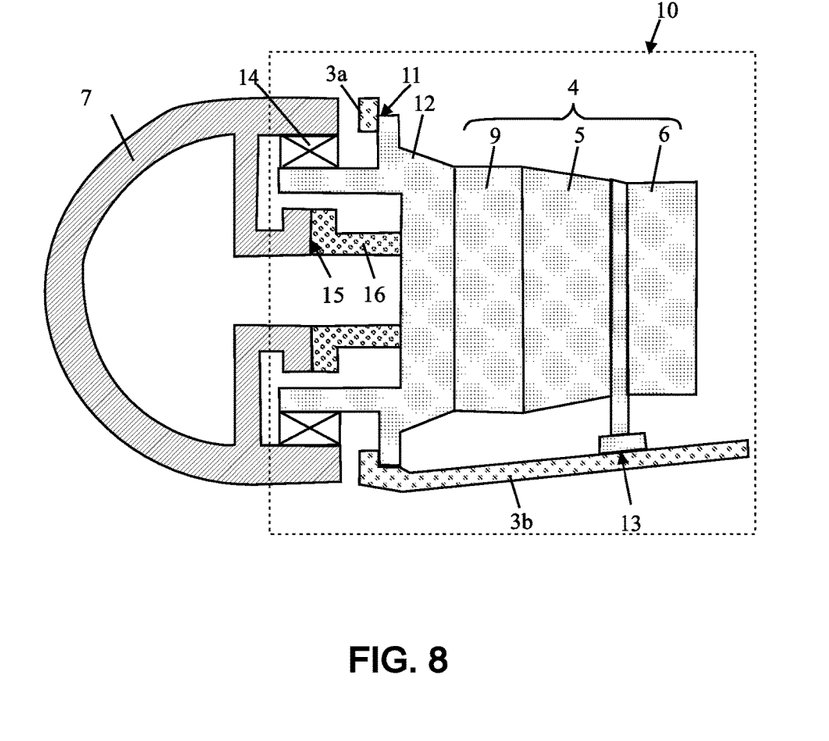

According to other embodiments, however, the at least one main bearing 14 for supporting the rotor 7 may also be located on the drive train 4. This is illustrated in FIG. 8. In the example given in FIG. 8, the at least one main bearing 14 may be adapted for being connected to the rotor 7 by its outer ring. Consequently, the at least one main bearing 14 may be adapted for being connected to the drive train 4 by its inner bearing. However, according to other embodiments, the at least one main bearing 14 may also be adapted for being connected to the rotor 7 of the wind turbine 1 by its inner bearing (not shown in the figures). In such cases, the at least one main bearing 14 may be adapted for being connected to the first part 3a of the nacelle main frame structure 3 by its outer bearing.

Figure 6:
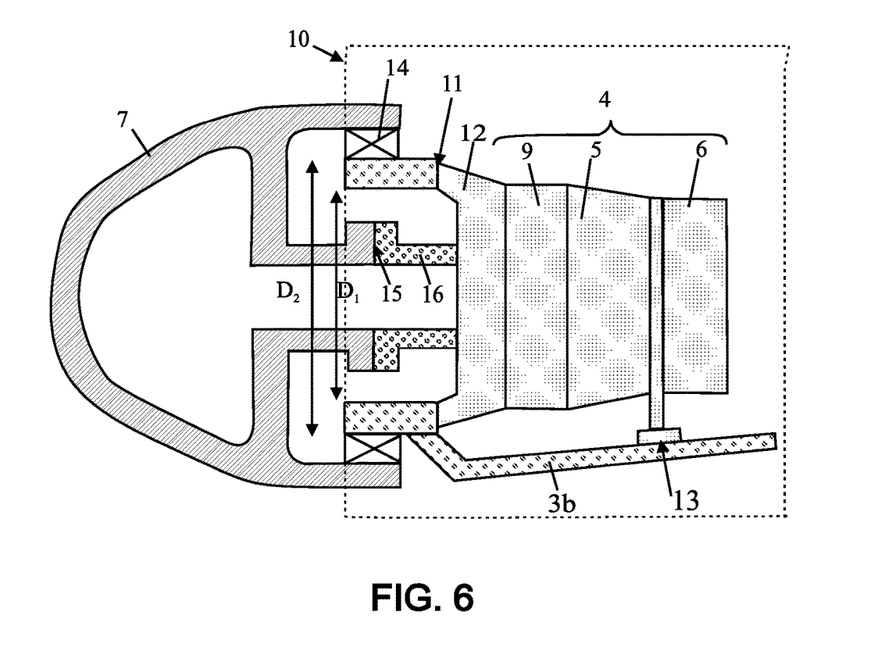
FIG. 6 to FIG. 10 show cross-sections of a nacelle main frame structure and drive train assembly according to embodiments of the invention which are attached to a rotor of a wind turbine.

According to further embodiments of the invention and as can be seen from FIG. 6 to FIG. 8, when a nacelle main frame structure and drive train assembly 10 according to embodiments of the invention is mounted in a wind turbine 1, the drive train 4 may, next to the first and second connection interface 11, 13 with the nacelle main frame structure 3, furthermore comprise a third connection interface 15 with the rotor 7 of the wind turbine 1. According to embodiments of the invention, this further connection interface 15 may be formed between the rotor 7 and a drive train flange 16.

Figure 9:
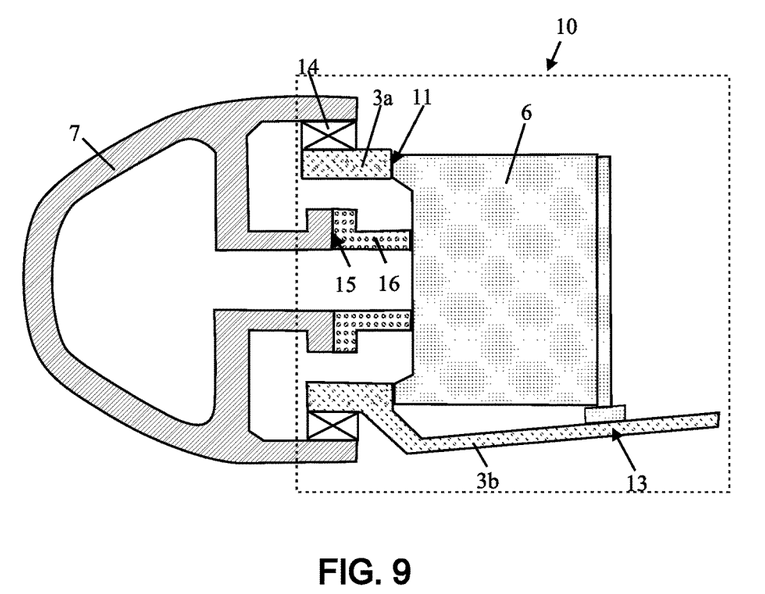

In the above described embodiments, the drive train 4 always comprised a gearbox 5 and a generator 6. However, according to other embodiments of the invention, the drive train 4 may comprise only a generator 6. This is illustrated in FIG. 9. In the example given, the main bearing 14 may be connected to the rotor 7 via its outer ring and may be connected to the first part 3a of the nacelle main frame structure 3 via its inner ring. It has to be understood that this may also be the other way around and that the main bearing 14 may be connected to the rotor 7 via its inner ring and to the first part 3a of the nacelle main frame structure 3 via its outer ring, similar as is illustrated in FIG. 7 for the case where the main bearing 14 is located on the first part 3a of the nacelle main frame structure 3.

Figure 10:
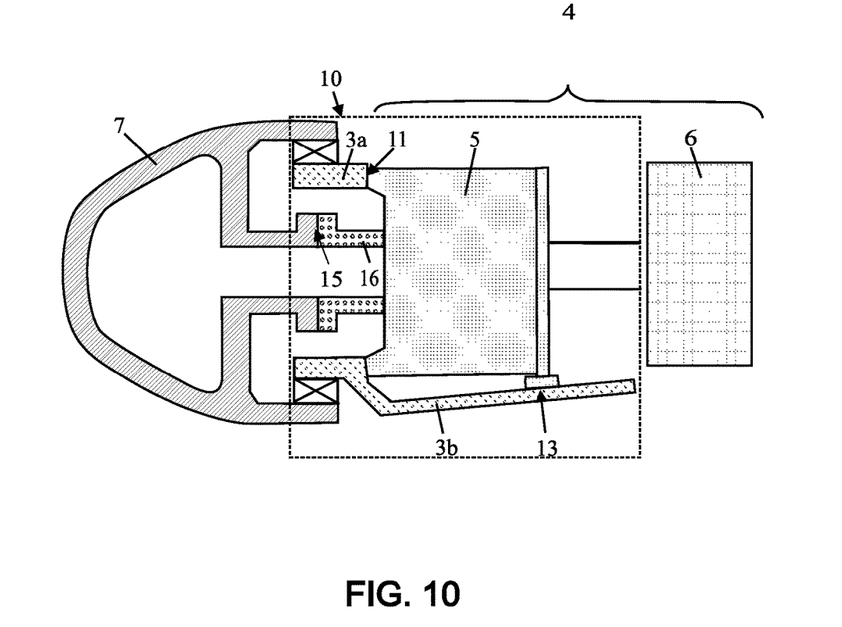

Furthermore, in the above described embodiments, the nacelle main frame structure and drive train assembly 10 is illustrated as always comprising the complete drive train 4. However, according to other embodiments of the invention, the nacelle main frame structure and drive train assembly 10 may only comprise part of the drive train 4. For example and as illustrated in FIG. 10, the gearbox 5 may be part of the nacelle main frame structure and drive train assembly 10 while the generator 6 may be located outside the nacelle main frame structure and drive train assembly 10.

As a consequence of the design of a nacelle main frame structure and drive train assembly 10 according to embodiments of the invention and as described above, a majority of all rotor loads will be transferred from the rotor 7 via the drive train 4 to the tower 2 of the wind turbine 1. With rotor loads is meant all loads and forces originating from the movement and weight of the rotor 7 of the wind turbine 1. With a majority of the rotor loads being transferred over the drive train 4 is meant that the biggest part of the rotor loads will be transferred over the drive train 4, but there will be also a minor part of the rotor loads that still will be transferred over the nacelle main frame structure 3. However, that part of the rotor loads that still will be transferred over the nacelle main frame structure 3 will be much smaller than currently is the case for prior art nacelle main frame structure and drive train assemblies.

Rotor loads coming from the rotor 7 are first transferred to the main bearing 14. At the location of the main bearing 14, the first connection interface 11 between the nacelle main frame structure 3 and the drive train 4 is located. Because of that, the rotor loads are transferred from the main bearing 14 to the drive train 4. The rotor loads are then, via the second connection interface 13 at a location which is axially displaced with respect to the first connection interface 11 as considered in a direction away from the rotor side R, further transferred to the tower 2 of the wind turbine 1.

Hence, in the design of a nacelle main frame structure and drive train assembly 10 according to embodiments of the invention, the drive train 4 takes most of the rotor loads and transfers them to the tower 2 of the wind turbine 1. Thus, according to embodiments of the invention, the drive train 4 forms part of the load path. In other words, the drive train 4 provides stiffness to the nacelle main frame structure 3.

An advantage hereof is that, according to embodiments of the present invention, the nacelle main frame structure 3 requires considerably less material compared to existing nacelle main frame structures because a majority of the rotor loads are transferred via the drive train 4 and not via the nacelle main frame structure 3 itself. As a consequence, the nacelle main frame structure 3 will have a lower weight than existing nacelle main frame structures.

Furthermore, there is no need for an additional structure to be provided to bring the rotor loads from a horizontal axis of the rotor 7 to a vertical axis of the tower 2, because this is achieved by providing two connection interfaces 11, 13 which are substantially perpendicular to each other (see higher) and thus by using the drive train 4 as a load path between these two axes.

Another advantage of a nacelle main frame structure and drive train assembly 10 according to embodiments of the invention is that the drive train 4 can be easily removed from the assembly for, for example servicing purposes, without having to dismount the rotor 7 from the nacelle main frame structure 3. The drive train 4 can be disconnected at the two connection interfaces 11, 13 and can then be removed axially. This means that it can be moved back to the back of the nacelle main frame structure 3 behind the tower 2 of the wind turbine 1 in a direction substantially parallel to the axis of the drive train 4, where it then can be lowered to the ground. Insertion of the drive train 4 back into the nacelle main frame structure 3 after servicing, or to assemble a nacelle main frame structure and drive train assembly 10 according to embodiments of the invention, can also easily be performed. Without the drive train 4 in place, the weight of the rotor 7 will cause the nacelle main frame structure 3 to slightly tilt forward. This is a benefit during insertion of the drive train 4 because it provides slightly more space such that, when the drive train 4 is put into place, it fits tight in the nacelle main frame structure 3. For inserting it, first the drive train 4 may be connected to the nacelle main frame structure 3 at the first connection interface 11 and to the rotor 7 at the further connection interface 15. Second, the second connection interface 13 is tightened, bringing the nacelle main frame structure 3 in place and thereby causing the drive train 4 to become part of the load path.

A nacelle main frame structure and drive train assembly 10 according to embodiments of the invention combines the benefits of a nacelle main frame structure 3 having a low weight and the easy exchangeability of the drive train 4 or drive train components from the nacelle main frame structure 3. Hence, no compromise has to be made between low weight or easy exchangeability which is the case for currently existing turbine designs.

The invention claimed is:

1. A nacelle main frame structure and drive train assembly for being mounted on a tower of a wind turbine, the nacelle main frame structure and drive train assembly comprising a single unit nacelle main frame structure and at least part of a drive train, wherein
the at least part of the drive train comprises at least one of a gear box, a generator, and a ring gear; and
the single unit nacelle main frame structure comprises:
a first part comprising a first ring having a rotor side and a drive train side, the drive train side facilitates coupling the at least part of the drive train with the single unit nacelle main frame structure via a first connection interface and only a single main bearing facilitates coupling a rotor to the nacelle main frame structure and drive train assembly;
a second part comprising a second ring which facilitates connection with the tower and the second part is designed to support a second connection interface comprising a third ring for surrounding the at least part of the drive train remote from the first connection interface; and
an arcuate portion of the first ring and an arcuate portion of the second ring being joined along a curved surface integrally and permanently forming the single unit nacelle main frame structure;
a third connection interface facilitates coupling of the rotor of the wind turbine to the at least part of the drive train, and the third connection interface is surrounded by the first part and axially aligned with the rotor and the at least part of drive train;
a first end portion of the drive train being supported by the first connection interface of the first part while a second end portion of the drive train being supported by the third ring of the second connection interface; and
the first ring being parallel with respect to the third ring and the first ring being substantially perpendicular to the second ring in order to transfer a rotor load from a horizontal axis of the rotor in a direction toward the tower.

2. The nacelle main frame structure and drive train assembly according to claim 1, wherein the first connection interface is oriented in a direction substantially perpendicular to an axis of the drive train,
the second connection interface is oriented in a direction substantially parallel to an axis of the drive train, and
the first part is only integrally and permanently connected to the second part along a perimeter portion of the first part that is adjacent to a perimeter portion of the second part while a perimeter portion of the first part, that is spaced from the second part, and a perimeter portion of the second part, that is spaced from the first part, remain unconnected with one another.

3. The nacelle main frame structure and drive train assembly according to claim 1, wherein the single main bearing for supporting the rotor of the wind turbine is connected to a flange which forms at least part of the drive train.

4. The nacelle main frame structure and drive train assembly according to claim 1, wherein the single main bearing is connected to the rotor of the wind turbine via an outer ring of the single main bearing.

5. The nacelle main frame structure and drive train assembly according to claim 1, wherein the single main bearing is connected to the rotor of the wind turbine via an inner ring of the single main bearing.

6. The nacelle main frame structure and drive train assembly according to claim 1, wherein the third connection interface is axially aligned with the at least part of the drive train and comprises a ring having an outer diameter smaller than an inner diameter of the first part.

7. The nacelle main frame structure and drive train assembly according to claim 1, wherein the at least part of the drive train comprises both the gearbox and the generator.

8. The nacelle main frame structure and drive train assembly according to claim 1, wherein the at least part of the drive train only comprises the generator.

9. The nacelle main frame structure and drive train assembly according to claim 1, wherein the third connection interface couples the rotor to a flange, and the rotor is supported on a first side of the first part while the flange abuts against an opposed second surface of the first part which is opposite to the rotor.

10. The nacelle main frame structure and drive train assembly according to claim 1, wherein the gearbox is located between the first ring and the third ring.

11. The nacelle main frame structure and drive train assembly according to claim 1, wherein the ring gear is located between the first ring and the third ring.

12. A nacelle main frame structure and drive train assembly for being mounted on a tower of a wind turbine, the nacelle main frame structure and drive train assembly comprising:
    a single unit nacelle main frame structure and at least part of a drive train;
    the single unit nacelle main frame structure comprising:
        a first part comprising a first ring defining a rotor side and a drive train side, the drive train side facilitates coupling the at least part of the drive train with the single unit nacelle main frame structure via a first connection interface and only a single main bearing facilitates coupling a rotor with the nacelle main frame structure and drive train assembly;
        a second part of the single unit nacelle main frame structure comprising a second ring which facilitates connection of the nacelle main frame structure and drive train assembly with a tower, and the second part being designed to support a second connection interface comprising a third ring for surrounding the at least part of the drive train remote from the first connection interface;
        an arcuate portion of the first part and an arcuate portion of the second part being joined along a curved surface integrally and permanently forming the single unit nacelle main frame structure; and
        a third connection interface facilitating coupling of the rotor of the wind turbine to a flange of the drive train, the third connection interface being axially aligned with the rotor and the flange of the drive train and being surrounded by the first part, and the flange abutting against the drive train side of the first part which is opposite to the rotor side of the first part.

13. The single unit nacelle main frame structure and drive train assembly according to claim 12, wherein the single main bearing is connected to the first part of the single unit nacelle main frame structure.

14. The single unit nacelle main frame structure and drive train assembly according to claim 12, wherein the single main bearing is connected to the flange of the at least part of a drive train.

15. The single unit nacelle main frame structure and drive train assembly according to claim 12, wherein the third connection interface has an outer diameter which is smaller than an inner diameter of the first part.

16. The single unit nacelle main frame structure and drive train assembly according to claim 14, wherein the single main bearing is connected to the rotor of the wind turbine via an outer ring of the single main bearing which surrounds the third connection interface.

17. The single unit nacelle main frame structure and drive train assembly according to claim 14, wherein the single main bearing is connected to the rotor of the wind turbine via an inner ring of single main bearing which surrounds the third connection interface.

18. A nacelle main frame structure and drive train assembly for being mounted on a tower of a wind turbine, the nacelle main frame structure and drive train assembly comprising a single unit nacelle main frame structure and at least part of a drive train,
    the single unit nacelle main frame structure comprising:
        a first part comprising a first ring having a drive train side and a rotor side where the drive train side facilitates coupling the at least part of the drive train with the single unit nacelle main frame structure via a first connection interface and only a single main bearing facilitates coupling a rotor with the nacelle main frame structure and drive train assembly;
        a second part comprising a second ring for coupling the nacelle main frame structure with the tower and a second connection interface, the second connection interface supporting a third ring for supporting at least one of a gear box and a generator remote from the first part of the nacelle main frame structure; and
        an arcuate portion of the first ring and an arcuate portion of the second ring being joined along a curved surface integrally and permanently forming the single unit nacelle main frame structure, the single unit nacelle main frame structure is configured to transfer a rotor load from a horizontal axis of the rotor in a direction toward the tower by having the first part be less than but substantially perpendicular to the second part and the first ring and the third ring being parallel with respect to each other;
    a third connection interface facilitating a coupling of the rotor of the wind turbine to the at least part of the drive train via a drive train flange, and the third connection interface being axially aligned with the rotor and the at least part of drive train; and
    the at least part of the drive train comprising at least one of the gear box, the generator, and a ring gear.

* * * * *